US009438393B2

(12) United States Patent
Kobayashi et al.

(10) Patent No.: US 9,438,393 B2
(45) Date of Patent: Sep. 6, 2016

(54) RADIO PARAMETER CONTROL APPARATUS, RADIO BASE STATION, RADIO PARAMETER CONTROL METHOD, AND NON-TRANSITORY COMPUTER READABLE MEDIUM

(75) Inventors: Kosei Kobayashi, Tokyo (JP); Hiroto Sugahara, Tokyo (JP); Yasuhiko Matsunaga, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 144 days.

(21) Appl. No.: 14/348,545

(22) PCT Filed: Jun. 12, 2012

(86) PCT No.: PCT/JP2012/003816
§ 371 (c)(1),
(2), (4) Date: Mar. 28, 2014

(87) PCT Pub. No.: WO2013/046502
PCT Pub. Date: Apr. 4, 2013

(65) Prior Publication Data
US 2014/0256335 A1    Sep. 11, 2014

(30) Foreign Application Priority Data

Sep. 29, 2011 (JP) ................................. 2011-215094

(51) Int. Cl.
*H04L 5/00* (2006.01)
*H04W 16/22* (2009.01)
(Continued)

(52) U.S. Cl.
CPC ........... *H04L 5/0037* (2013.01); *H04B 17/373* (2015.01); *H04B 17/382* (2015.01);
(Continued)

(58) Field of Classification Search
None
See application file for complete search history.

(56) References Cited

U.S. PATENT DOCUMENTS 6,188,913 B1 * 2/2001 Fukagawa ............ H01Q 3/2605
342/359
2005/0113099 A1 * 5/2005 Eriksson ............. H04W 72/005
455/450

(Continued)

FOREIGN PATENT DOCUMENTS

JP    H11-150754 A    6/1999
JP    2000-082992     3/2000
(Continued)

OTHER PUBLICATIONS

Extended European Search Report issued by the European Patent Office for Application No. 12837331.3 dated Apr. 8, 2015 (8 pages).
(Continued)

*Primary Examiner* — Daniel Lai
(74) *Attorney, Agent, or Firm* — Wilmer Cutler Pickering Hale and Dorr LLP

(57) ABSTRACT

A radio parameter control apparatus decides a radio parameter from which a throughput of UE is improved. A radio parameter control apparatus includes: a radio quality prediction unit (12) that predicts radio quality of a radio terminal due to change of a radio parameter of a radio cell; a resource-allocated number-of-communications prediction unit (13) that predicts the number of communications considered as allocation targets of radio resources in a radio cell due to the change of the radio parameter; a communication quality prediction unit (14) that predicts communication quality due to the change of the radio parameter based on a prediction result of the radio quality and a prediction result of the number of communications; and a radio parameter decision unit (15) that decides a radio parameter by which improvement of communication quality is predicted based on the predicted communication quality.

46 Claims, 8 Drawing Sheets

(51) Int. Cl.
  *H04B 17/373* (2015.01)
  *H04B 17/382* (2015.01)
  *H04W 52/14* (2009.01)
  *H04W 52/22* (2009.01)
  *H04W 52/26* (2009.01)
  *H04W 52/38* (2009.01)
  *H04B 17/26* (2015.01)
  *H04B 17/336* (2015.01)
  *H04W 52/40* (2009.01)

(52) U.S. Cl.
  CPC ......... *H04W 16/22* (2013.01); *H04W 52/143* (2013.01); *H04W 52/223* (2013.01); *H04W 52/267* (2013.01); *H04W 52/386* (2013.01); *H04B 17/26* (2015.01); *H04B 17/336* (2015.01); *H04W 52/40* (2013.01)

(56) References Cited

U.S. PATENT DOCUMENTS

| | | | | |
|---|---|---|---|---|
| 2006/0015814 | A1* | 1/2006 | Rappaport | ............ H04L 41/145 715/733 |
| 2006/0240834 | A1* | 10/2006 | Sawaya | ................ H04W 16/18 455/446 |
| 2009/0143070 | A1 | 6/2009 | Shu et al. | |
| 2010/0034185 | A1* | 2/2010 | De Bruin | .............. H04L 1/0006 370/342 |
| 2012/0287813 | A1* | 11/2012 | Alm | ...................... H04L 1/0003 370/252 |

FOREIGN PATENT DOCUMENTS

| | | |
|---|---|---|
| JP | 2007/074097 A | 3/2007 |
| JP | 2009-290494 | 12/2009 |
| WO | WO-00/72618 | 11/2000 |
| WO | WO-2006/075447 A1 | 7/2006 |
| WO | WO-2006/077450 A1 | 7/2006 |
| WO | WO-2008/143026 A1 | 11/2008 |
| WO | WO-2009/023587 | 2/2009 |
| WO | WO-2010/001928 | 1/2010 |

OTHER PUBLICATIONS

International Search Report Corresponding to PCT/JP2012/003816, Aug. 28, 2012, 1 page.

Decision to Grant Patent issued by the Japanese Patent Office for Japanese Application No. 2013-535828 mailed on Mar. 17, 2015 with English translation (6 pages).

Takechi, R. et al., "Technology to Optimize Radio Access Networks: Self-Organizing Network (SON)," Fujitsu, vol. 62, No. 4, pp. 449-454 (Jul. 8, 2011).

Japanese Notification of Reasons for Refusal issued in corresponding Japanese Application No. 2015-082200, dated Feb. 23, 2016, 7 pages.

* cited by examiner

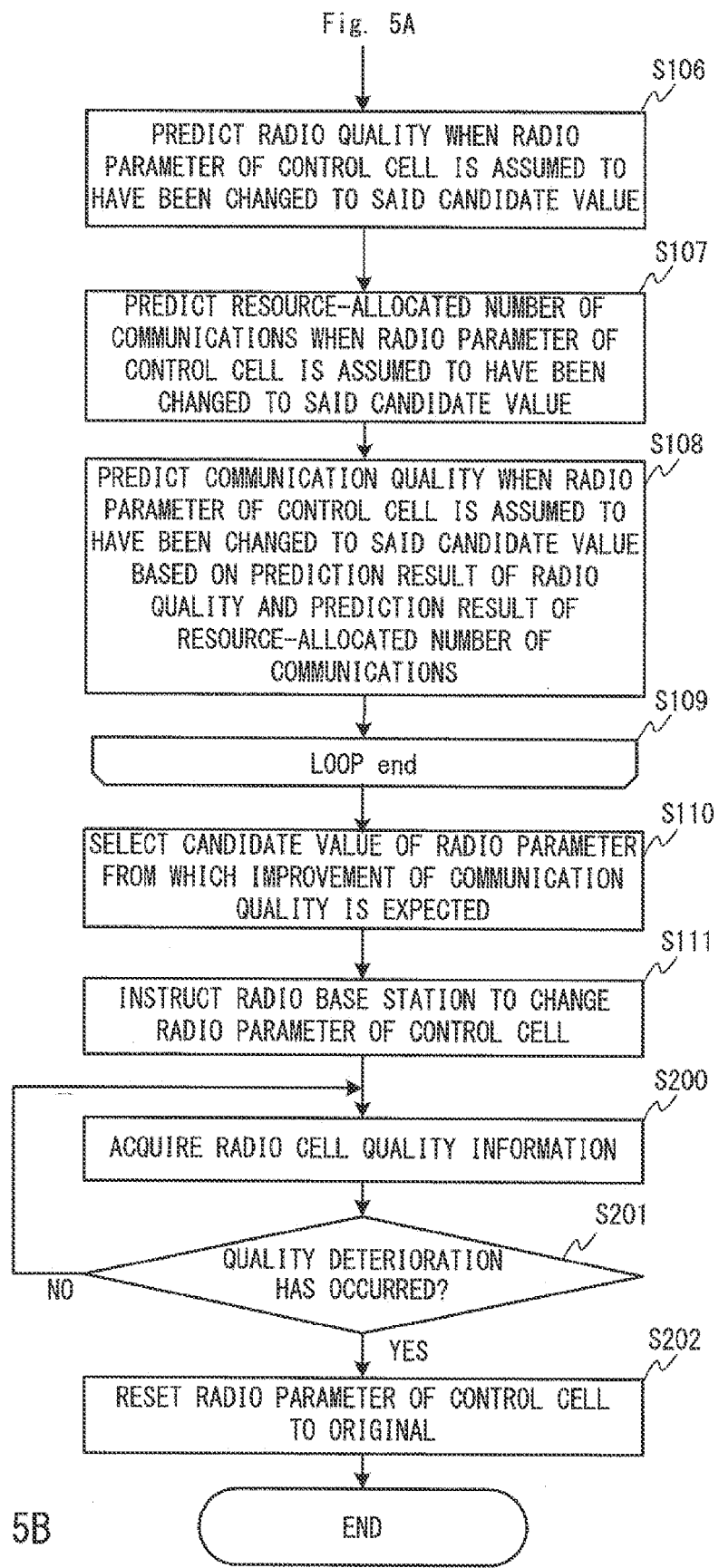

RADIO PARAMETER CONTROL APPARATUS, RADIO BASE STATION, RADIO PARAMETER CONTROL METHOD, AND NON-TRANSITORY COMPUTER READABLE MEDIUM

CROSS-REFERENCE TO RELATED APPLICATIONS

This application is a national stage application of International Application No. PCT/JP2012/0003816 entitled "Radio Parameter Control Apparatus, Radio Base Station, Radio Parameter Control Method, and Non-Temporarily Computer-Readable Medium," filed on Jun. 12, 2012, which claims the benefit of the priority of Japanese Patent Application No. 2011-215094, filed on Sep. 29, 2011, the disclosures of each of which are hereby incorporated by reference in their entirety.

TECHNICAL FIELD

The present invention relates to a radio parameter control apparatus, a radio base station, a radio parameter control method, and a program in a wireless communication network and, in particular, to a radio parameter control apparatus, a radio base station, a radio parameter control method, and a program that autonomously control a radio parameter of a radio cell.

BACKGROUND ART

In a cellular wireless communication network typified by mobile phones, a wide service area is configured by decentrally deploying a plurality of radio base stations. Each radio base station forms a radio cell that is a range within which communication can be performed with the radio base station. Usually, approximately one to six radio cells are managed by one radio base station. In addition, coverage of each of mutually adjacent radio cells is partially overlapped with each other, and thereby communication can be maintained by a handover also in a radio terminal (UE: User Equipment) moving across the radio cells.

At the time of installation of the radio base station and during operation thereof, coverage optimization of the radio cell is performed for the purposes of reducing an area where communication cannot be performed (coverage hole) and of improving communication quality of the UE, particularly a throughput thereof. Generally, a drive test using a specialized measuring instrument is carried out on the field. In the drive test, a received power and an interference condition of a radio wave, abnormal disconnection of communication and occurrence of handover failure, a throughput, etc. are measured. A location where the received power is insufficient (weak coverage), a location where a strong interference has been received (pilot pollution), etc. are then identified, and adjustment of a radio parameter to solve these problems is performed. As the radio parameter to be adjusted, for example, an antenna tilt angle, an antenna azimuth, a transmission power, a handover parameter, etc of a radio cell are generally used.

Since the coverage optimization of the radio cell based on the above-mentioned drive test involves manual measurement and tuning work of the radio parameter, the operational cost of the wireless communication network increases. Consequently, in order to reduce the cost for such coverage optimization of the radio cell, a technology to autonomously optimize the coverage of the radio cell has been proposed.

According to a technique disclosed in Patent Literature 1, a femto cell (A) receives a measurement result of radio quality from a UE connected to the femto cell (A). When the radio quality does not satisfy an acceptable value, the femto cell (A) then instructs an adjacent femto cell (B) to reduce a transmission power. The femto cell (B) instructed to reduce the transmission power predicts radio quality after reduction of a transmission power of the UE connected to the femto cell (B), for example, an SINR (Signal to Interference plus Noise Ratio). When the predicted SINR satisfies the acceptable value, the femto cell (B) then carries out reduction of the transmission power as instructed by the femto cell (A).

According to a technique disclosed in Patent Literature 2, a radio cell measures its (own cell's) traffic load. At the time of a high traffic load, the radio cell then selects a radio cell which largely overlaps with the own cell from neighboring cells with a low traffic load. Coverage of the selected radio cell is then expanded, and coverage of the own cell is narrowed. Meanwhile, when the own cell's traffic load is low, coverage of a neighboring cell is narrowed, and coverage of the own cell is expanded.

CITATION LIST

Patent Literature

[Patent Literature 1]
International Patent Publication No. WO2009/023587
[Patent Literature 2]
International Patent Publication No. WO2000/072618

SUMMARY OF INVENTION

Technical Problem

Generally, a throughput of UE is dependent on radio quality (for example, an SINR) of the UE, and the number of communications considered as the allocation targets of the radio resources (for example, the number of UEs and the number of radio bearers that are considered as allocation targets of radio resources) in a radio cell (serving cell) to which the UE is connected. Namely, generally, the better the radio quality of the UE is, the higher the throughput that can be expected. However, in a radio communication system that shares finite radio resources among a plurality of UEs, the throughputs of the UEs deteriorate when there are a large number of UEs considered as the allocation targets of the radio resources since communication opportunities per UE decrease.

In Patent Literature 1, a prediction result of radio quality of a UE when a transmission power is assumed to have been changed is used for determining whether to change a transmission power of a femto cell. However, a change of the number of UEs of the femto cell due to the change of the transmission power is not taken into account. Therefore, there is a possibility that an increase or decrease in the communication opportunity caused by an increase or decrease of the number of UEs of the femto cell cannot be taken into account, and consequently the throughputs of the UEs cannot be correctly predicted. This problem occurs more easily in a macro cell, microcell, a pico cell, etc. than in the femto cell. The reason for this is that since the macro cell, the micro cell, the pico cell, etc. generally accommodate more UEs than the femto cell does, a change in the number of UEs due to the coverage change easily occurs.

The aim of Patent Literature 2 is to improve communication quality by balancing traffic loads between radio cells in a predetermined range. However, particularly in a case where a UE distribution in the radio cells is biased, when coverage is changed only in consideration of a traffic load, there is a high possibility of causing a deterioration of the radio quality of the UE, and deteriorating throughputs.

The present invention has been made in view of the above-described problems, and an object thereof is to provide a radio parameter control apparatus, a radio base station, a radio parameter control method, and a program that can achieve a radio parameter control apparatus that can decide a radio parameter by which throughputs of UEs are improved.

Solution to Problem

A radio parameter control apparatus according to a first aspect of the present invention includes: a radio quality prediction unit that predicts radio quality of a radio terminal due to change of a radio parameter of a radio cell; a resource-allocated number-of-communications prediction unit that predicts the number of communications considered as allocation targets of radio resources in a radio cell due to the change of the radio parameter; a communication quality prediction unit that predicts communication quality due to the change of the radio parameter based on a prediction result of the radio quality and a prediction result of the number of communications; and a radio parameter decision unit that decides a radio parameter by which improvement of communication quality is predicted based on the predicted communication quality.

A radio base station according to a second aspect of the present invention includes: a radio quality prediction unit that predicts radio quality of a radio terminal due to change of a radio parameter of a radio cell; a resource-allocated number-of-communications prediction unit that predicts the number of communications considered as allocation targets of radio resources in a radio cell due to the change of the radio parameter; a communication quality prediction unit that predicts communication quality due to the change of the radio parameter based on a prediction result of the radio quality and a prediction result of the number of communications; a radio parameter decision unit that decides a radio parameter by which improvement of communication quality is predicted based on the predicted communication quality.

A radio parameter control method according to a third aspect of the present invention including, predicting radio quality of a radio terminal due to change of a radio parameter of a radio cell, predicting the number of communications considered as allocation targets of radio resources in a radio cell due to the change of the radio parameter, predicting communication quality due to the change of the radio parameter based on a prediction result of the radio quality and a prediction result of the number of communications, and deciding a radio parameter by which improvement of communication quality is predicted based on the predicted communication quality.

A program that makes a computer execute the steps of: predicting radio quality of a radio terminal due to change of a radio parameter of a radio cell; predicting the number of communications considered as allocation targets of radio resources in a radio cell due to the change of the radio parameter; predicting communication quality due to the change of the radio parameter based on a prediction result of the radio quality and a prediction result of the number of communications; and deciding a radio parameter by which improvement of communication quality is predicted is decided based on the predicted communication quality.

Advantageous Effects of Invention

According to the present invention, since the communication quality after the change of the radio parameter is predicted using the prediction results of both the radio quality and the number of communications considered as the allocation targets of the radio resources, it becomes possible to more accurately predict a throughput of the UE due to the change of the radio parameter, and to decide the radio parameter by which the throughput of the UE is improved.

BRIEF DESCRIPTION OF DRAWINGS

Best modes for carrying out the present invention will be explained in detail with reference to drawings. The same symbols are attached to the same or corresponding components in each drawing, and overlapping explanations are omitted if necessary.

DESCRIPTION OF EMBODIMENTS

Embodiment 1 of the Invention

Figure 1:
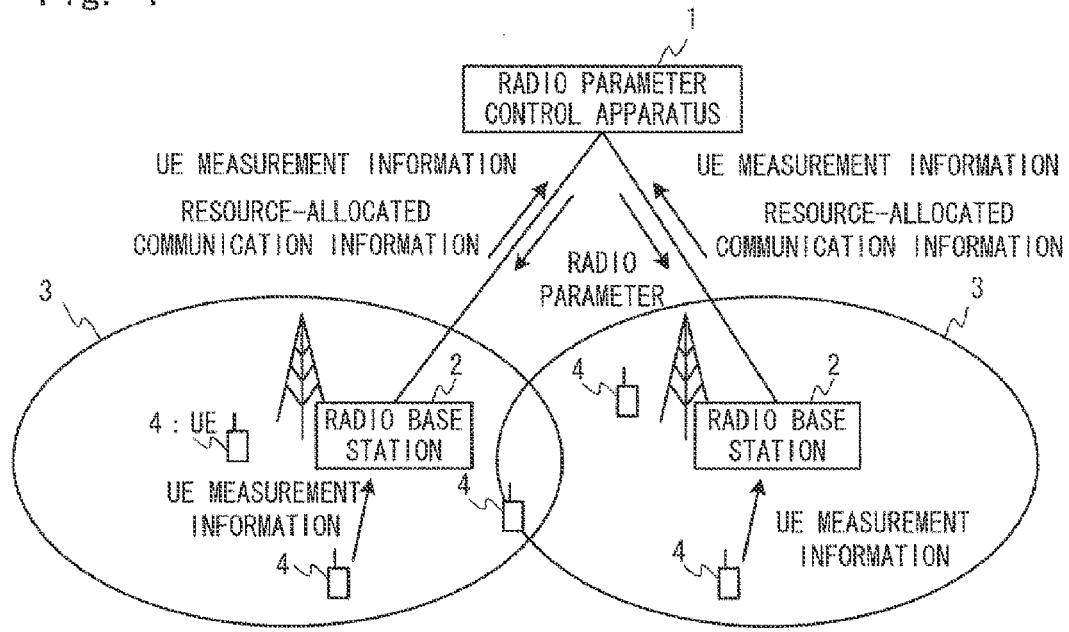
FIG. 1 is a configuration diagram of a wireless communication network according to a first exemplary embodiment.

FIG. 1 is a diagram showing a configuration example of a wireless communication network including a radio parameter control apparatus 1 pertaining to the embodiment. A radio base station 2 manages a radio cell 3, and performs two-way wireless communication with a plurality of radio terminals (hereinafter, UE) 4. The radio base station 2 is connected to an upper network (not shown), and relays traffic between the UE 4 and the upper network. The upper network includes a wireless access network and a core network. It is to be noted that the radio base station 2 includes a relay base station that relays a radio signal of the radio cell 3. In addition, although a configuration where each radio base station 2 manages one radio cell 3 has been exemplified in FIG. 1, the present invention is not limited to this. Namely, a configuration may be one where each radio base station 2 manages a plurality of radio cells 3.

The radio parameter control apparatus 1 acquires radio quality (hereinafter, UE measurement information) measured by the UE 4 through the radio base station 2. The UE measurement information includes a measurement result of radio quality of the radio cell 3 (serving cell) to which the UE 4 is connected. Furthermore, the UE measurement information may include measurement results of radio quality of neighboring cells other than the serving cell of the UE 4. A typical example of the radio quality measured by the UE 4 is received quality of a radio signal (downlink signal) transmitted from the radio base station 2.

The received quality is, for example, a received power of a downlink pilot signal or a downlink reference signal, or a signal-to-noise interference ratio such as an SINR (Signal to Interference plus Noise Ratio) of a downlink pilot signal or a downlink reference signal. In a case of W-CDMA, radio quality measured by the UE 4 may be a received power (CPICH RSCP (Received Signal Code Power)) of a CPICH (Common Pilot Channel) for each radio cell, or a ratio of energy per chip of the CPICH to a received power density in a band (Ec/No). In addition, in a case of LTE (Long Term Evolution), radio quality measured by the UE 4 may be a received power (RSRP: Reference Signal Received Power) or received quality (RSRQ: Reference Signal Received Quality) of the downlink reference signal.

Furthermore, the UE measurement information may include information such as communication quality such as a throughput and a BLER (Block Error Rate), event information on abnormal disconnection and occurrence of handover failure, a time when the UE measured radio quality, an identifier of the radio cell 3 corresponding to each radio quality, and an identifier of the UE 4.

In addition, the radio parameter control apparatus 1 acquires from the radio base station 2 a measurement result of information (resource-allocated communication information) on the number of communications considered as allocation targets of radio resources. A typical example of the resource-allocated communication information is the number of UEs (the resource-allocated number of UEs) considered as the allocation targets of the radio resources in the radio cell 3, or the number of radio bearers (the resource-allocated number of bearers) considered as the allocation targets of the radio resources in the radio cell 3. The resource-allocated number of UEs may be only the number of UEs to which the radio resources have been actually allocated, and the number of UEs whose data is stored in a buffer of the radio base station 2 (i.e., the radio base station 2 has untransmitted data) and which are waiting for the radio resource to be allocated may be further included in the resource-allocated number of UEs. Much of the above is also applicable to the resource-allocated number of bearers. The radio parameter control apparatus 1 may acquire resource-allocated communication information at one time that the radio base station 2 measured, or may acquire a value that summarizes the resource-allocated communication information over a predetermined period. For example, when the radio base station 2 measures the resource-allocated number of UEs or the resource-allocated number of bearers for each predetermined sampling period (for example, one second) for each radio cell 3 that the radio base station 2 itself manages, and holds an averaged value thereof over a predetermined period (for example, thirty minutes), the radio parameter control apparatus 1 acquires the value as the resource-allocated communication information.

Alternatively, the radio parameter control apparatus 1 may perform average processing of the values measured in the radio base station 2. In such average processing, a time when the communicating UE and radio bearers do not exist, specifically, a time when a radio resource for communication of user plane information is not allocated to any of the UEs, is preferably excluded from a processing target.

The radio parameter control apparatus 1 predicts throughputs of the UEs when a radio parameter of the radio cell 3 is assumed to have been changed using the acquired UE measurement information and resource-allocated communication information. It is to be noted that "when the radio parameter is assumed to have been changed" means that the radio parameter of the radio cell is not actually changed, and instead means that the radio parameter is changed virtually by analytical means, logical means, or simulation etc. In addition, the radio parameter control apparatus 1 applies to the radio cell 3 a value of a radio parameter by which improvement of the throughputs of the UEs can be expected, and changes coverage of the radio cell 3.

Details of radio parameter decision processing will be given later. A specific example of the radio parameter that can change the coverage of the radio cell is a maximum transmission power of a downlink signal, transmission power of a pilot signal or a reference signal, a tilt angle of an antenna, or an azimuth of the antenna, etc associated with the radio cell 3. In addition, a CIO (Cell Individual Offset) and a Qoffset may be used as the radio parameter.

In W-CDMA and LTE, the radio base station notifies the UE of the CIO and the Qoffset together with a list of measurement target cells. The CIO is a parameter relating to a handover, and is used as an offset to a received power of a neighboring cell in the UE triggering the handover based on a measurement value of the received power of the neighboring cell. In addition, the Qoffset is a parameter relating to cell selection, and is used as an offset to the received power of the neighboring cell in the UE in an idle state selecting a serving cell based on the measurement value of the received power of the neighboring cell. Since those radio cells whose offset values are set to high are easy to be selected by the UE, an effect similar to that of expanding the coverage of a radio cell can be obtained.

It is to be noted that although in the above, a configuration example where each radio base station 2 is directly connected to the radio parameter control apparatus 1 is shown, the present invention is not limited to that configuration. For example, each radio base station 2 may be connected to another radio base station 2 through a communication line (not shown), and may be connected to the radio parameter control apparatus 1 through the other radio base station 2.

Hereinafter, specific examples of a configuration of the radio parameter control apparatus 1 and the radio parameter decision processing will be explained in detail.

Figure 2:
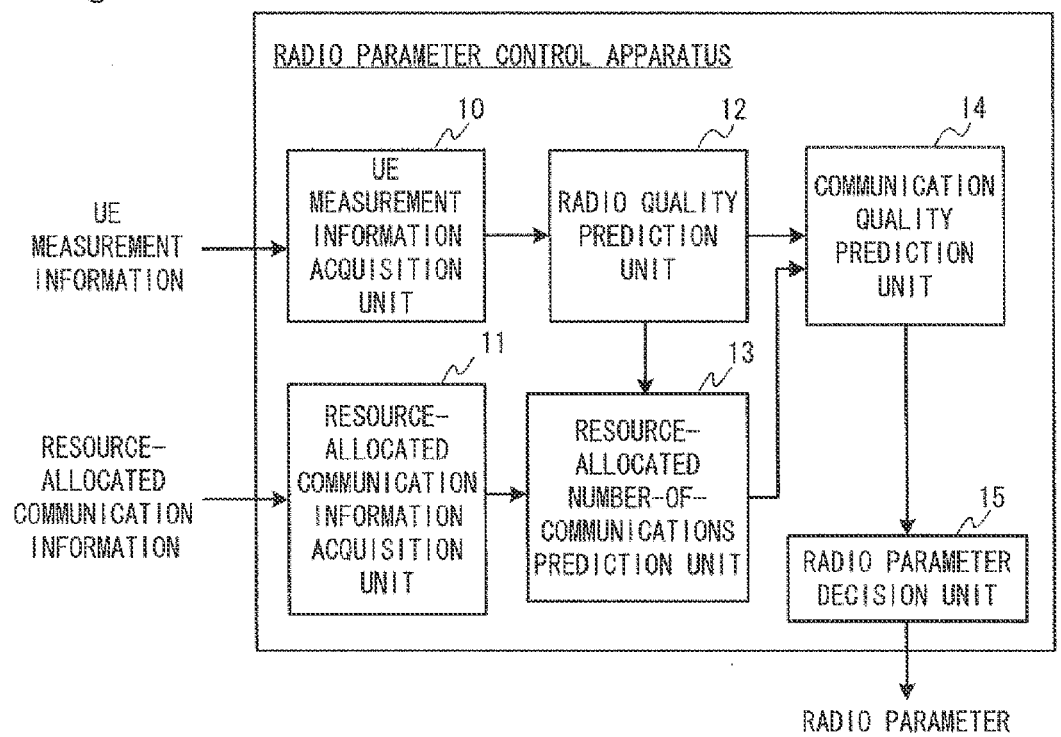
FIG. 2 is a configuration diagram of a radio parameter control apparatus according to the first exemplary embodiment.

FIG. 2 is a block diagram showing a configuration example of the radio parameter control apparatus 1. A UE measurement information acquisition unit 10 acquires radio quality (UE measurement information) measured by the UE 4. The radio base station 2 may instruct the UE to measure and report the radio quality, or the UE measurement information acquisition unit 10 of the radio parameter control apparatus 1 may instruct the UE to do the same through the radio base station 2. For example, the UE measurement information acquisition unit 10 can instruct the UE to measure and report the radio quality for each predetermined period or at the time of occurrence of a predetermined event (for example, at the time of a communication start, communication end, a handover, abnormal disconnection, etc.).

A resource-allocated communication information acquisition unit 11 acquires resource-allocated communication information of the radio cell 3 measured by the radio base station 2. For example, the resource-allocated communication information acquisition unit 11 acquires the number of UEs (the resource-allocated number of UEs) considered as the allocation targets of the radio resources in the radio cell 3, or the number of radio bearers (the resource-allocated number of bearers) considered as the allocation targets of the radio resources in the radio cell 3, or information corresponding thereto. As mentioned above, the resource-allocated communication information that the resource-allocated communication information acquisition unit 11 acquires may be information that the radio base station 2 measured at one time, or may be a summary of information from over a predetermined period.

A radio quality prediction unit 12 predicts radio quality (for example, a received power or a signal-to-noise interference ratio of each radio cell) and a serving cell of the UE when the radio parameter of the radio cell 3 is assumed to have been changed using the UE measurement information that the UE measurement information acquisition unit 10 has acquired.

A resource-allocated number-of-communications prediction unit 13 predicts the resource-allocated number of communications, for example an average resource-allocated number of UEs that is an average value of the number of UEs considered as the allocation targets of the radio resources and an average resource-allocated number of bearers that is an average value of the number of radio bearers considered as the allocation targets of the radio resources, for each radio cell when the radio parameter of the radio cell 3 is assumed to have been changed using the resource-allocated communication information that the resource-allocated communication information acquisition unit 11 has acquired.

It is to be noted that when the radio parameter of the radio cell 3 is changed, a radio cell (serving cell) which a UE is connected to may be changed according to the UE as a result of switching a radio cell which indicates the highest received power. As a result of this, even if a spatial distribution of the UE does not change, there is a possibility that the resource-allocated number of communications of each radio cell may be changed by changing the radio parameter of the radio cell 3. In order to take this possibility into account, when the resource-allocated number of communications for each radio cell is predicted in the resource-allocated number-of-communications prediction unit 13, prediction results of the radio quality and the serving cell of the UE by the radio quality prediction unit 12 may be used.

A communication quality prediction unit 14 predicts communication quality (for example, a throughput) of each UE when the radio parameter of the radio cell 3 is assumed to have been changed, based on the prediction result of the radio quality of the UE by the radio quality prediction unit 12, and a prediction result of the resource-allocated number of communications for each radio cell by the resource-allocated number-of-communications prediction unit 13. Details of a prediction method of the communication quality will be given later.

A radio parameter decision unit 15 decides a radio parameter of the radio cell 3 by which improvement of the communication quality can be expected based on a prediction result of the communication quality by the communication quality prediction unit 14. The radio parameter decision unit 15 notifies the radio base station 2 of the decided radio parameter, and instructs it to update the radio parameter of the radio cell 3.

Next, a specific example of the radio parameter decision processing by the radio parameter control apparatus 1 pertaining to the embodiment will be explained. In the specific example, the radio parameter control apparatus 1 sets a radio parameter of a newly added radio cell. Hereinafter, a radio cell whose radio parameter is set to is referred to as a control cell. The control cell may be the newly added radio cell, or may be a neighboring radio cell of the newly added radio cell.

Figure 3:
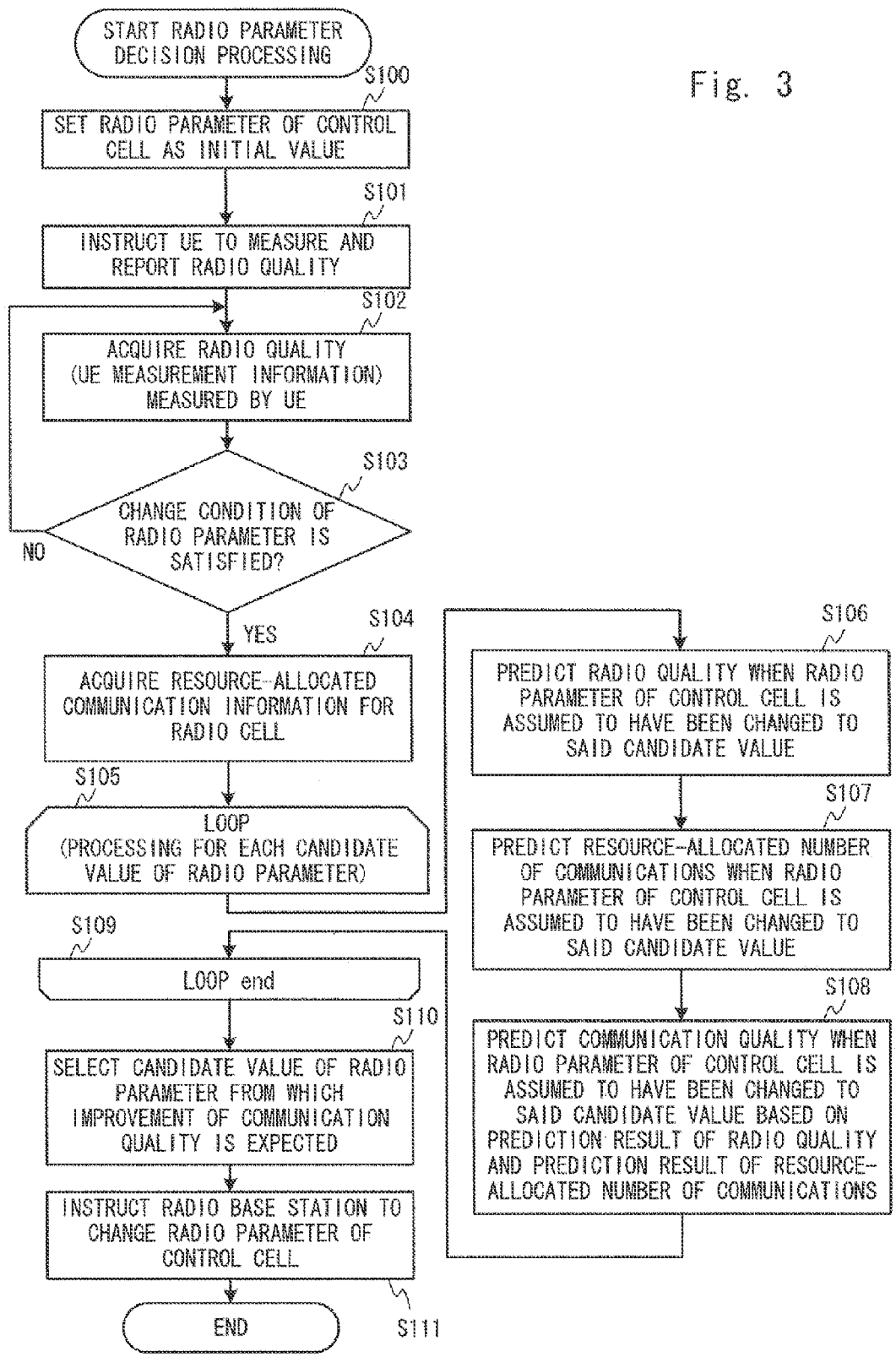
FIG. 3 is a flowchart of a radio parameter decision processing according to the first exemplary embodiment.

FIG. 3 is a flow chart showing a specific example of the radio parameter decision processing. In step S100, the radio parameter decision unit 15 of the radio parameter control apparatus 1 sets a radio parameter of the control cell as an initial value. For example, the radio parameter decision unit 15 sets a maximum transmission power of a downlink signal of the control cell as a settable maximum value. For example, 46 dBm may be set as an initial value for a macro cell, 30 dBm for a pico cell, etc. It is to be noted that when the radio base station 2 itself has a function to set the initial value of the radio parameter, a radio parameter specified by the radio base station 2 may be applied.

In step S101, the UE measurement information acquisition unit 10 of the radio parameter control apparatus 1 instructs the UEs connected to the control cell and/or neighboring cells of the control cell to measure and report radio quality. For example, when a UE is in a communication state, the UE measurement information acquisition unit 10 instructs the UE to measure and report radio quality for each predetermined period for each radio cell that the UE can measure or for each radio cell for which measurement has been instructed by the radio base station. As mentioned above, for example, in the case of W-CDMA, the radio quality measured by the UE may be the received power (RSCP) of the common pilot signal, or the ratio of the energy per chip of the common pilot signal to the received power density in the band (Ec/No). In addition, for example, in the case of LTE, the radio quality measured by the UE may be the received power (RSRP) or the received quality (RSRQ) of the downlink reference signal.

In step S102, the UE measurement information acquisition unit 10 of the radio parameter control apparatus 1 acquires the radio quality (UE measurement information) measured by the UEs.

In step S103, the radio parameter decision unit 15 of the radio parameter control apparatus 1 determines whether or not a change condition of a radio parameter is satisfied. For example, whether or not the number of UE measurement information that the UE measurement information acquisition unit 10 has acquired has reached a predetermined value, or whether or not a predetermined time has elapsed after the UE measurement information acquisition unit 10 starts to acquire the UE measurement information, or whether or not a predetermined time has come, etc. may be applied as a change condition of the radio parameter. If the change condition of the radio parameter is satisfied, the processing proceeds to step S104, and if it is not satisfied, the processing returns to step S102. It is to be noted that although control of the radio parameter as in the present invention includes control for a relatively short period, such as a second, and control for a relatively long period, such as an hour or a day, the present invention is applicable in both cases.

In step S104, the resource-allocated communication information acquisition unit 11 of the radio parameter control apparatus 1 acquires resource-allocated communication information of the control cell and/or the neighboring cells of the control cell. For example, as mentioned above, the radio base station 2 measures the resource-allocated number of UEs or the resource-allocated number of bearers for each predetermined sampling period for each radio cell 3 that the radio base station 2 itself manages. Additionally, the resource-allocated communication information acquisition unit 11 of the radio parameter control apparatus 1 acquires a value obtained by averaging for a predetermined period the resource-allocated number of UEs or the resource-allocated number of bearers that the radio base station 2 has measured. Here, although the predetermined period for averaging preferably includes some or all of periods in which the UE measurement information has been acquired, the present invention is not limited to this. For example, in consideration of daily traffic periodicity, resource-allocated communication information acquired on a day different from a day that the UE measurement information was acquired on, but acquired in the same time zone as a time zone in which the UE measurement information was acquired, may be used.

Steps S105 to S109 are loop processing performed for each candidate value of the radio parameter. Hereinafter, as one example, a case where a transmission power of the control cell is changed will be explained. When a maximum transmission power applicable to the control cell is 46 dBm, a candidate value of the transmission power may be, for example, set at 1 dB interval from 46 dBm to 30 dBm.

In step S106, the radio quality prediction unit 12 of the radio parameter control apparatus 1 predicts radio quality when the radio parameter of the control cell is assumed to have been changed to each candidate value. Prediction of the radio quality can be performed for each of the measurement results of the UE measurement information that the UE measurement information acquisition unit 10 has acquired. At this time, it is preferable to take into account that the radio cell (serving cell) to which the each UE is connected may be changed by changing the transmission power of the control cell, even if the UE stays at the same location.

A serving cell of each UE (UE measurement information) when the transmission power of the control cell is assumed to have been changed to each candidate value can be predicted to be a radio cell predicted to have a highest received power after the change of the transmission power. Specifically, a received power of each radio cell after the change of the transmission power may be predicted assuming that only the received power of the control cell changes by the same amount of the change of the transmission power of the control cell. As one example, a case where the UE measurement information acquisition unit 10 has acquired as the UE measurement information the received power of the downlink signal for each radio cell measured by the UE will be explained.

As for the radio quality (SINR) when the transmission power of the control cell is assumed to have been changed to each candidate value, a ratio of "a prediction value of the received power of the serving cell (i.e., a radio cell having a highest prediction value of the received power)", and "a total sum of prediction values of received powers of radio cells other than the serving cell plus a thermal noise" may be calculated for each UE measurement information, assuming that only the received power of the control cell changes by the same amount of the change of the transmission power of the control cell. It is to be noted that generally, the higher a traffic load of a radio cell is, the higher a received power from the radio cell becomes. Therefore, a value obtained by weighting the received power of the radio cell according to the traffic load of the radio cell may be used as the received power of the radio cell. At this time, a traffic load for each radio cell when the transmission power of the control cell is assumed to have been changed to each candidate value can be predicted, for example, using a ratio of the number of UE measurement information before the transmission power of the control cell is changed to each candidate value, and when the transmission power of the control cell is assumed to have been changed, similarly to the average resource-allocated number of UEs that will be mentioned next. As the traffic load, a radio resource usage rate for each radio cell, for example, a resource block usage rate, a power usage rate, etc. may be used.

In step S107, the resource-allocated number-of-communications prediction unit 13 of the radio parameter control apparatus 1 predicts the resource-allocated number of communications for each radio cell when the radio parameter of the control cell is assumed to have been changed to the candidate value. As one example, a case will be explained where the resource-allocated communication information acquisition unit 11 has acquired the average resource-allocated number of UEs from each radio cell. Given X as the average resource-allocated number of the UEs of a radio cell A that the resource-allocated communication information acquisition unit 11 has acquired, X' as a prediction value of the average resource-allocated number of UEs of the radio cell A when the transmission power of the control cell is assumed to have been changed to each candidate value, and R as a change rate of the number of UEs of the radio cell A when the transmission power of the control cell is assumed to have been changed to each candidate value, the average resource-allocated number of UEs can be predicted as $X'=X \times R$. Here, the change rate (R) of the number of UEs of the radio cell A can be predicted using the UE measurement information that the UE measurement information acquisition unit 10 has acquired. Specifically, first, the number of UE measurement information (N1) whose serving cell is the radio cell A is calculated for each UE measurement information. Subsequently, the number of UE measurement information (N2) whose serving cell is the radio cell A when the transmission power of the control cell is changed to each candidate value is calculated, assuming that only the received power of the control cell changes by the same amount of the change of the transmission power. For example, when the radio cell A is the radio cell adjacent to the control cell, the number of UE measurement information (N2) in which a received power of the radio cell A is predicted to be the highest one after the change of the transmission power of the control cell, i.e., the number of UE measurement information (N2) in which the radio cell A is predicted to be the serving cell, increases more than the number of UE measurement information (N1) whose serving cell is the radio cell A before the change of the transmission power of the control cell by decreasing the transmission power of the control cell. At this time, the change rate (R) of the number of UEs of the radio cell A can be predicted as $R=N2/N1$.

In step S108, the communication quality prediction unit 14 of the radio parameter control apparatus 1 predicts communication quality when the radio parameter of the control cell is assumed to have been changed to each candidate value, based on the prediction result of the radio quality by the radio quality prediction unit 12, and the prediction result of the resource-allocated number of communications by the resource-allocated number-of-communications prediction unit 13. Prediction of the communication quality may also be performed for each UE measurement information that the UE measurement information acquisition unit 10 has acquired, similarly to the case of prediction of the radio quality. As one example of the prediction method of communication quality, a method in which the communication quality prediction unit 14 predicts a throughput of each UE as communication quality when the radio quality prediction unit 12 predicts the SINR for each UE measurement information, and the resource-allocated number-of-communications prediction unit 13 predicts the average resource-allocated number of UEs for each radio cell, will be explained. First, the communication quality prediction unit 14 predicts a throughput (TPmax) for each UE measurement information using the SINR for each UE measurement information predicted by the radio quality prediction unit 12 assuming all system bandwidth can be used. For example, the throughput (TPmax) is calculated as follows using Shannon's well-known theory in the field of wireless communication.

$$TPmax = BW \times \log_2(1+SINR) \times \alpha \quad \text{(Formula 1)}$$

Here, BW denotes a system bandwidth, $\alpha$ denotes a coefficient indicating a deterioration quantity from a theoretical limitation caused dependent on implementation of a receiver, etc., and for example, a value of 0.6 may be used. As another technique for predicting TPmax, a table of a communication speed corresponding to the SINR may be previously created and referenced instead of using Shannon's theory. Next, a serving cell after the change of the transmission power of the control cell is predicted for each UE measurement information, assuming that only the received power of the control cell changes by the same amount of the change of the transmission power of the control cell. Given X' as a prediction result of the average resource-allocated number of UEs of the serving cell that the resource-allocated number-of-communications prediction unit 13 has predicted, a throughput (TP) of the UE measurement information when the transmission power of the control cell is assumed to have been changed can be predicted as follows.

$$TP = TPmax/X' \quad \text{(Formula 2)}$$

It is to be noted that such processing to divide the throughput TPmax by the average resource-allocated number of UEs is applicable when frequency resources are allocated among the plurality of UEs, or when time resources are allocated among the plurality of UEs as in an OFDMA scheme used in LTE. Meanwhile, when the plurality of UEs that share a frequency band are separated by codes as in the W-CDMA, an effect of the average resource-allocated number of UEs is reflected in the SINR, and the throughput (TP) of the UE measurement information becomes the same as the TPmax.

In step S110, the radio parameter decision unit 15 of the radio parameter control apparatus 1 selects a candidate value of a radio parameter by which improvement of communication quality is expected based on the communication quality predicted for each candidate value of the radio parameter. For example, an average value of the communication quality predicted for each UE measurement information, or a specific communication quality extracted from the communication quality predicted for each UE measurement information, can be used. As an example of the specific communication quality value, a lower 5-percentile value or a lower 10-percentile value of CDF (Cumulative Distribution Function) of the communication quality that is often used as a quality index for a boundary area (cell edge) of the radio cell may be used. In addition, in order to minimize variation in the communication quality among the UEs, variance and standard deviation of the communication quality predicted for each UE measurement information may be used. The radio parameter decision unit 15 calculates at least one evaluation value of the communication quality for each candidate value of the radio parameter, like above, and selects a candidate value of the radio parameter by which the evaluation value is the most improved. As a specific example, a method for selecting a candidate value of the radio parameter by which an average value of the throughputs is the most improved, or a method for selecting a candidate value of the radio parameter by which the lower 5-percentile value of the throughputs is the most improved while maintaining the average value of the throughputs, can be applied.

In step S111, the radio parameter decision unit 15 of the radio parameter control apparatus 1 instructs the radio base station to apply to the control cell the candidate value of the radio parameter selected in step S110.

It is to be noted that although in the embodiment, a configuration where the radio base station (a control base station) that manages the control cell and the radio base station (a neighboring base station) that manages the neighboring cell are connected to the radio parameter control apparatus 1 has been mentioned, the present invention is not limited to this configuration. For example, a configuration where some or all of the neighboring base stations are not connected to the radio parameter control apparatus 1, and instead the control base station and the neighboring base stations are connected thereto through the communication line (not shown), may be employed. In this case, the control base station acquires through the communication line at least either one of the UE measurement information and the resource-allocated communication information of the neighboring cell, and notifies the radio parameter control apparatus 1 of the information. The radio parameter control apparatus 1 may decide the radio parameter of the control cell using the UE measurement information and the resource-allocated communication information of the control cell or the neighboring cell.

In addition, although in the embodiment, the example where prediction of the radio quality and prediction of the communication quality are performed for each UE measurement information that the UE measurement information acquisition unit 10 has acquired has been explained, the present invention is not limited to this. For example, a case where a plurality of UE measurement information acquired from a same UE at different timings have a same UEID value regarding a plurality of UE measurement information that UE measurement information acquisition unit 10 has acquired, will be explained. In such a case, average processing of the plurality of UE measurement information in which the same UEID is set may be performed, and prediction of the radio quality and prediction of the communication quality may be performed for each UE measurement information for to which the average processing has been performed.

As mentioned above, the radio parameter control apparatus 1 pertaining to the embodiment predicts the throughputs when the radio parameter of the radio cell is assumed to have been changed, and decides the value of the radio parameter by which improvement of the throughputs are expected, based on the radio qualities that have been measured and reported by UEs and the resource-allocated communication information for each radio cell. For this reason, according to the embodiment, a radio parameter by which the throughputs of the UEs are improved can be decided.

Embodiment 2 of the Invention

Figure 4:
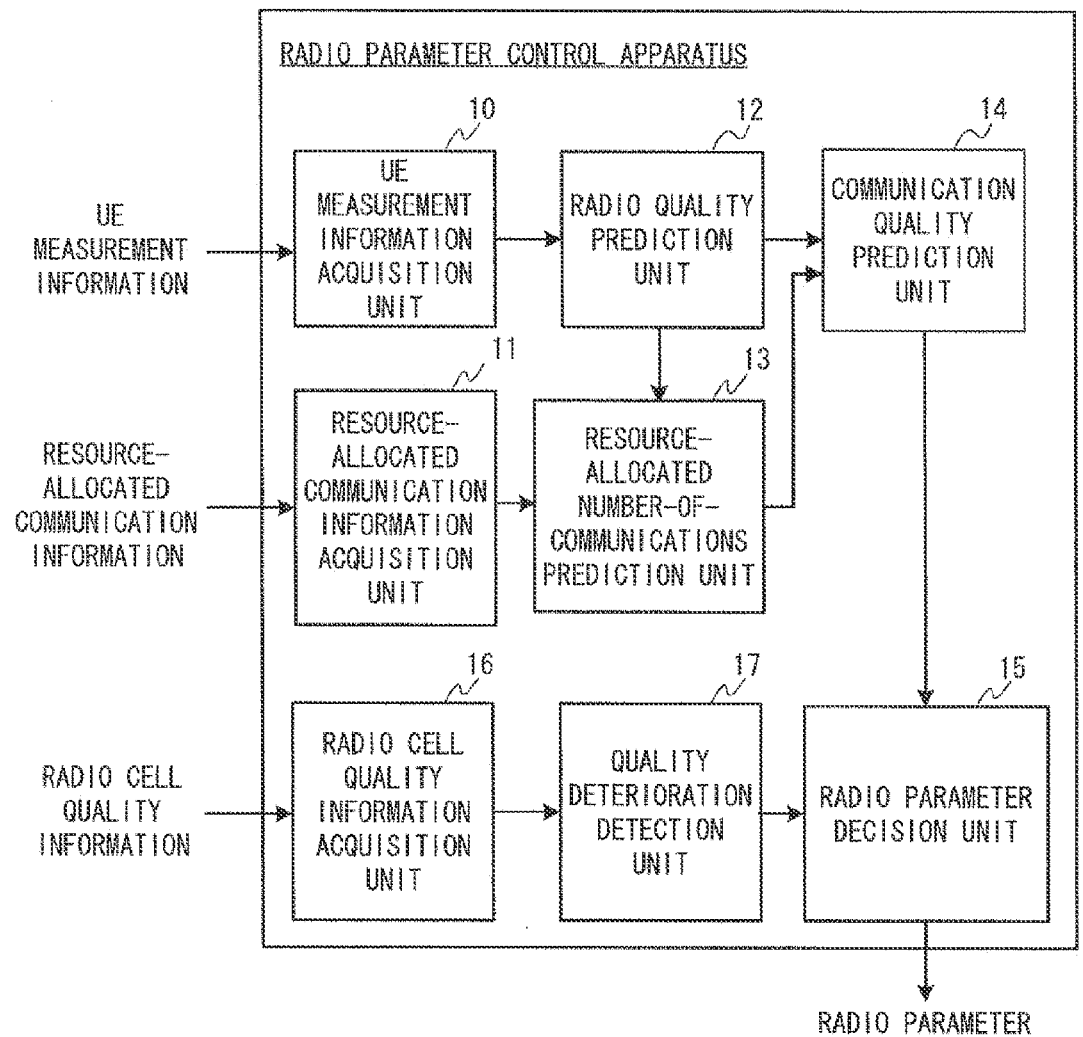
FIG. 4 is a configuration diagram of a radio parameter control apparatus according to a second exemplary embodiment.

A second embodiment for carrying out the present invention will be explained in detail with reference to the drawings. FIG. 4 is a diagram showing a configuration example of the radio parameter control apparatus 1 pertaining to the embodiment. The radio parameter control apparatus 1 pertaining to the second embodiment differs from the radio parameter control apparatus 1 pertaining to the first embodiment of the present invention in being provided with a radio cell quality information acquisition unit 16 and a quality deterioration detection unit 17.

The radio cell quality information acquisition unit 16 acquires radio cell quality information from each radio cell. The radio cell quality information is the information indicating quality of wireless communication performed in the radio cell, and for example, includes an abnormal disconnection rate of the wireless communication, a handover failure rate, a system throughput, an average user throughput, a radio resource usage rate, a packet transfer delay, etc. The radio base station usually sums up and records such information in 15-minute units, 30-minute units, etc., and uses it for network quality monitoring, etc.

The quality deterioration detection unit 17 detects quality deterioration of the radio cell based on the radio cell quality information that the radio cell quality information acquisition unit 16 has acquired. For example, the quality deterioration detection unit 17 determines whether or not the abnormal disconnection rate of the wireless communication or the handover failure rate exceeds an acceptable value, whether or not the system throughput or the average user throughput is less than an acceptable value, or whether or not traffic congestion has occurred. In addition, when quality deterioration is detected, the quality deterioration detection unit 17 instructs the radio parameter decision unit 15 to change the radio parameter.

Next, a specific processing example of radio parameter decision processing pertaining to the second embodiment will be explained.

When the quality deterioration detection unit 17 detects quality deterioration of the radio cell after the change of the radio parameter of the control cell, the radio parameter control apparatus 1 performs roll back processing to reset the radio parameter of the control cell to its original state.

Operation of the embodiment will be explained with reference to a flow chart of FIGS. 5A and 5B. It is to be noted that although as one example of this explanation, a modified example of the radio parameter decision processing pertaining to the first embodiment of the present invention shown in FIG. 3 will be explained, the present invention is not limited to this modified example. The modified example may be combined with another embodiment that will be mentioned later.

Figures 5A, 5B:
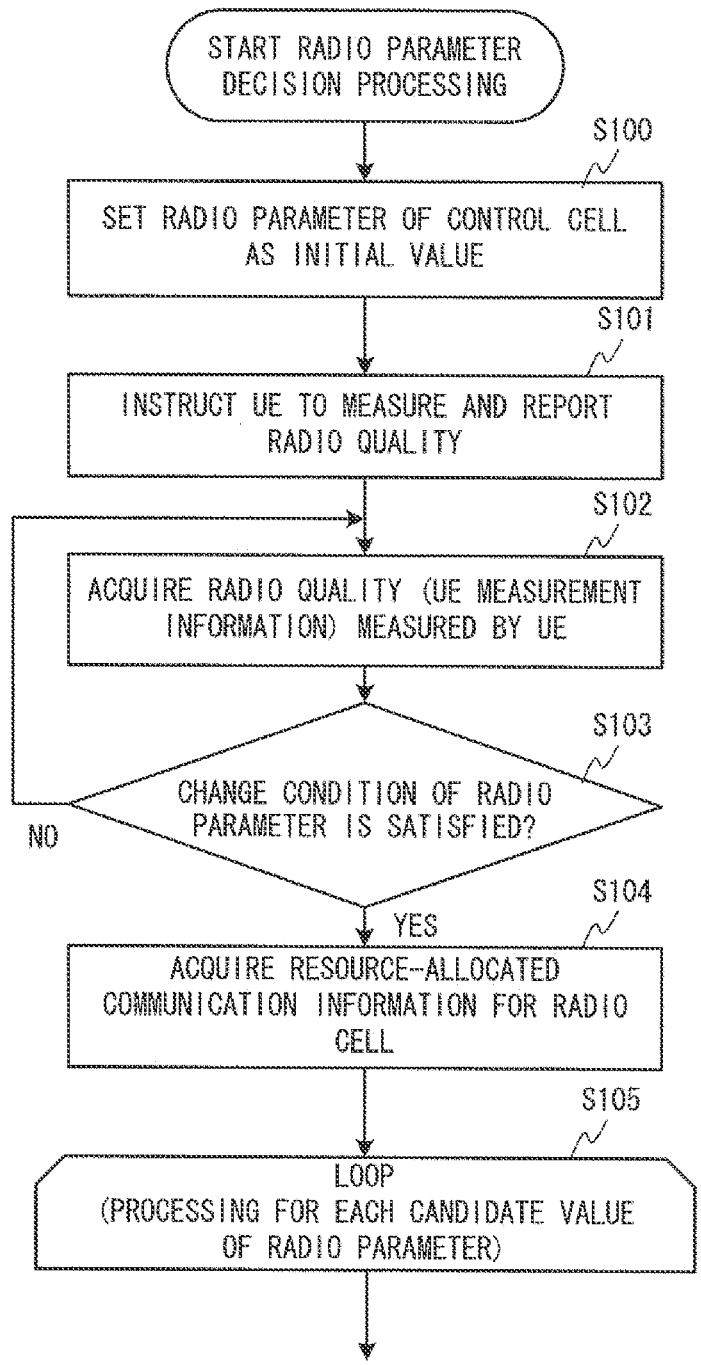
FIG. 5A is a flowchart of a radio parameter decision processing according to the second exemplary embodiment.
FIG. 5B is a flowchart of a radio parameter decision processing according to the second exemplary embodiment.

A difference between the radio parameter decision processing pertaining to the first embodiment of the present invention shown in FIG. 3 and that in the second embodiment is that the radio parameter decision processing pertaining to the modified example includes in FIG. 5B processing (step S200) to acquire radio cell quality information, processing (step S201) to determine quality deterioration, and processing (step S202) to reset the radio parameter of the control cell to the original parameter.

In step S200, the radio cell quality information acquisition unit 16 of the radio parameter control apparatus 1 acquires radio cell quality information from each radio cell, after the radio parameter of the control cell is changed in step S111.

In step S201, the quality deterioration detection unit 17 of the radio parameter control apparatus 1 determines whether or not quality deterioration occurs in each radio cell. For example, as mentioned above, the quality deterioration detection unit 17 determines whether or not the abnormal disconnection rate or the handover failure rate exceeds the acceptable value, whether or not the system throughput or the average user throughput is less than the acceptable value, or whether or not traffic congestion has occurred. It is to be noted that the quality deterioration detection unit 17 does not necessarily need to detect the quality deterioration using the radio cell quality information, and may detect the quality deterioration using the UE measurement information instead of the radio cell quality information. For example, the quality deterioration detection unit 17 may acquire actual measurement values of the throughput from the UEs, and may determine the quality deterioration by indices, such as an average value or the 5-percentile value of the throughputs acquired from the UEs. Alternatively, the quality deterioration detection unit 17 may calculate a difference of radio quality between the serving cell and its neighboring cell from the UE measurement information, and may determine quality deterioration by the number of UEs (i.e., UEs that exist near a boundary of the radio cells) or the ratio of UEs having the small difference. If quality deterioration is detected, processing proceeds to step S202, while if quality deterioration is not detected, processing returns to step S200.

In step S202, the radio parameter decision unit 15 of the radio parameter control apparatus 1 regards the quality deterioration detected by the quality deterioration detection unit 17 as being caused by the change of the radio parameter of the control cell, and instructs the radio base station to reset the radio parameter of the control cell to a value which had been set until the value was changed.

It is to be noted that, although in the above, a case where the radio parameter of the control cell is reset to a value which had been set until the value was changed is shown as an example of the operation executed when the quality deterioration is detected by the quality deterioration detection unit 17, the present invention is not limited to this. That is, when the quality deterioration is detected by the quality deterioration detection unit 17, instead of resetting the radio parameter of the control cell to a value which had been set until the value was changed, the radio parameter decision unit 15 may reselect another value. For example, when a plurality of candidate values of the radio parameter by which improvement of the communication quality is expected exist as a result of having predicted communication quality for each candidate value of the radio parameter in steps S105 to S109, the plurality of candidate values (referred to as a radio parameter set) of the radio parameter are stored. When the quality deterioration is then detected by the quality deterioration detection unit 17 as a result of the radio parameter of the control cell having been changed to a value P1 in step S111, the radio parameter decision unit 15 can select a value of the radio parameter other than P1 from the radio parameter set, and can apply it to the control cell.

As mentioned above, the radio parameter control apparatus 1 pertaining to the embodiment monitors quality of the radio cell after changing the radio parameter of the control cell, and when quality deterioration occurs, the radio parameter control apparatus 1 can reset the radio parameter to the original parameter, or can reset it to another value. Therefore, even in a case where the expected communication quality cannot be obtained due to environmental change etc., after the radio parameter of the control cell is changed, it becomes possible to restrict an effect of the quality deterioration to a minimum.

Embodiment 3 of the Invention

A third embodiment for carrying out the present invention will be explained in detail with reference to the drawings. The radio parameter control apparatus 1 pertaining to the embodiment is the same as that of FIG. 4. In addition, the quality deterioration detection unit 17 may notify the UE measurement information acquisition unit 10 and the resource-allocated communication information acquisition unit 11 of information on quality deterioration detection.

In the embodiment, the radio parameter control apparatus 1 detects quality deterioration of an operated radio cell, and starts decision processing of the radio parameter triggered by the quality deterioration. Operation example will be explained with reference to a flow chart of FIGS. 6A and 6B. A difference between the radio parameter decision processing pertaining to the first embodiment of the present invention shown in FIG. 3 and that in the third embodiment is that the radio parameter decision processing pertaining to the third embodiment includes in FIG. 6A the processing (step S200) to acquire the radio cell quality information, the processing (step S201) to determine the quality deterioration, and the processing (step S203) to select a control cell instead of the processing (step S100 of FIG. 3) to set the radio parameter of the control cell as the initial value.

In step S200, the radio cell quality information acquisition unit 16 of the radio parameter control apparatus 1 acquires radio cell quality information from each radio cell.

In step S201, the quality deterioration detection unit 17 of the radio parameter control apparatus 1 determines whether or not quality deterioration occurs in each radio cell. Since steps S200 and S201 are similar to corresponding steps in the second embodiment of the present invention, detailed explanation thereof will be omitted.

If quality deterioration is detected by the quality deterioration detection unit 17, processing proceeds to step S203, while if quality deterioration is not detected, processing returns to step S200.

In step S203, the radio parameter decision unit 15 of the radio parameter control apparatus 1 selects a radio cell (control cell) in which a radio parameter should be changed in order to eliminate the quality deterioration detected by the quality deterioration detection unit 17. For example, a radio cell in which quality deterioration has been detected may be selected as the control cell. In addition, a control cell may be selected from radio cells adjacent to the radio cell in which the quality deterioration has been detected. In addition, in a HetNet (Heterogeneous Network) environment where a pico cell that covers a relatively narrow area has been deployed in a macro cell covering a wide area, when quality deterioration is detected in a macro cell, the pico cell deployed in the macro cell may be selected as the control cell. In addition, decision processing of a radio parameter may be independently performed for each of radio cells which can be candidates of the control cell (control candidate cells); for example, each of the radio cells in which quality deterioration has been detected and the radio cell adjacent to the radio cell. In this case, using an optimal value of a radio parameter and communication quality expected when the value is applied which are calculated for each control candidate cell, a combination of a control candidate cell and a value of a radio parameter by which improvement of communication quality is the most expected is selected, and the selected value of the radio parameter may be applied to the selected control candidate cell.

Figure 6A:
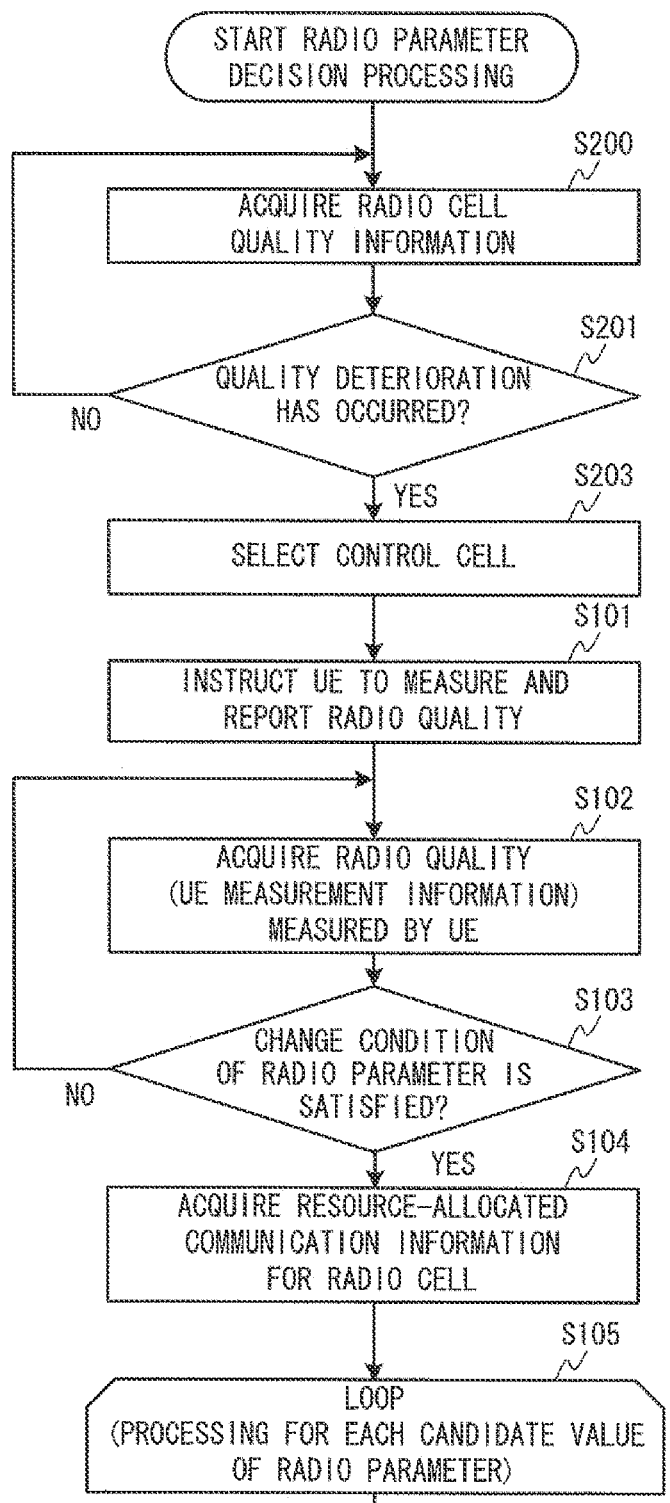
FIG. 6A is a flowchart of a radio parameter decision processing according to a third exemplary embodiment.
Figure 6B:
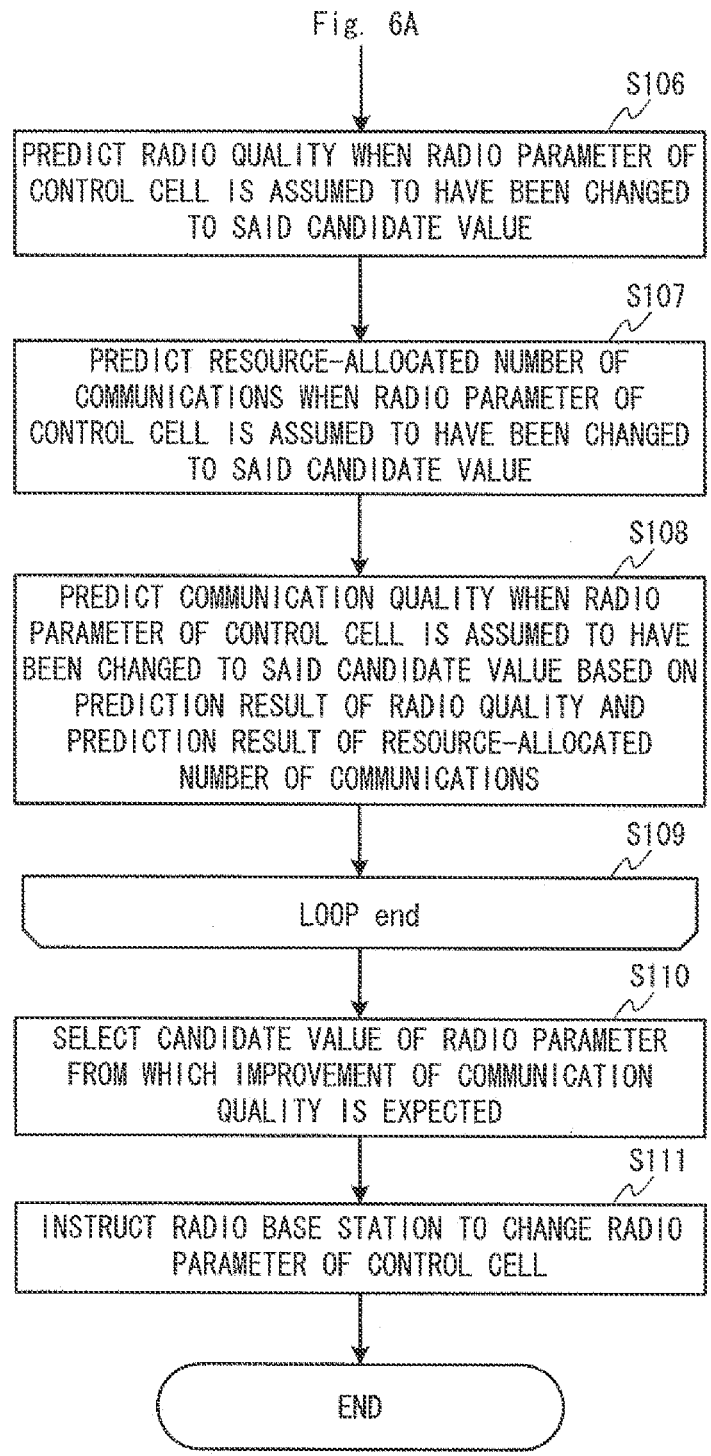
FIG. 6B is a flowchart of a radio parameter decision processing according to the third exemplary embodiment.

It is to be noted that although in the flow chart shown in FIGS. 6A and 6B, the UE is instructed to measure and report the radio quality in step S101 after quality deterioration is detected in step S201, the present invention is not limited to this. Namely, the UE may be instructed to always carry out measurement and report of the radio quality regardless of occurrence of quality deterioration. Naturally, the radio parameter decision processing pertaining to the embodiment may be combined with the radio parameter decision processing pertaining to the second embodiment of the present invention shown in FIGS. 5A and 5B.

Embodiment 4 of the Invention

A fourth embodiment for carrying out the present invention will be explained in detail with reference to the drawings. The fourth embodiment differs from the first to third embodiments of the present invention in functional arrangement of the radio parameter control apparatus 1.

Figure 7:
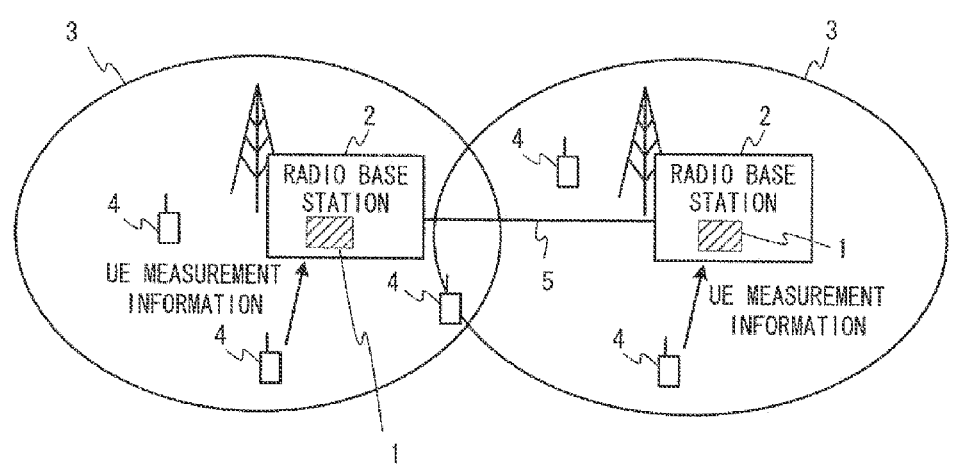
FIG. 7 is a wireless communication network according to a fourth exemplary embodiment.

In FIG. 7, a configuration example of a wireless communication network including the radio parameter control apparatus 1 pertaining to the embodiment is shown. As shown in FIG. 7, functions of the radio parameter control apparatus 1 may be arranged as part of the functions of the radio base stations 2. The radio base stations 2 are connected to each other through communication lines 5, such as a wired line or a wireless line, and a part or all of the UE measurement information and the resource-allocated communication information acquired in each radio base station 2 can be transmitted to another radio base station 2, or can be received from another radio base station. It is to be noted that the communication lines 5 between the radio base stations 2 may be virtual lines, and the radio base stations 2 may be indirectly connected to each other via a device (not shown in the Figure) of an upper network side.

Even in the case where the radio parameter control apparatus 1 is functionally arranged as a part of the radio base station 2 as in the embodiment, the radio parameter control apparatus 1 can have a configuration similar to that of the first to third embodiments of the present invention. Each radio base station 2 may decide a radio parameter using at least either one of the UE measurement information and the resource-allocated communication information acquired from the radio cell 3 that the radio base station 2 itself manages, and the UE measurement information and the resource-allocated communication information acquirable from a neighboring cell through the communication line 5.

As mentioned above, the radio parameter control apparatus 1 pertaining to the embodiment does not require an apparatus to manage the UE measurement information and the resource-allocated communication information in a centralized manner. Therefore, each radio base station can autonomously control a radio parameter.

Although the present invention has been explained as a configuration of hardware in the above-mentioned embodiments, the present invention is not limited to this. In the present invention, arbitrary processing can also be achieved by making a CPU (Central Processing Unit) execute a computer program.

In addition, the above-mentioned program is stored using various types of non-transitory computer readable media, and can be supplied to a computer. The non-transitory computer readable medium includes various types of tangible storage media. Examples of the non-transitory computer readable medium include: a magnetic recording medium (for example, a flexible disk, a magnetic tape, a hard disk drive); a magneto-optical recording medium (for example, a magneto-optical disk); a CD-ROM (Read Only Memory); a CD-R; a CD-R/W; and a semiconductor memory (for example, a mask ROM, a PROM (Programmable ROM), an EPROM (Erasable PROM), a flash ROM, a RAM (Random Access Memory)). In addition, the programs may be supplied to the computer by various types of transitory computer readable media. Examples of the transitory computer readable medium include an electrical signal, an optical signal, and an electromagnetic wave. The transitory computer readable medium can supply the program to the computer through a wired communication channel, such as an electric wire and an optical fiber, or a radio communication channel.

INDUSTRIAL APPLICABILITY

As explained above, the present invention is useful for control of the radio parameter of the radio cell and, in particular, it is suitable for a case where improvement of the throughput of the UE is achieved by optimizing the coverage of the radio cell.

Hereinbefore, although the invention in the present application has been explained with reference to the embodiments, the invention in the present application is not limited by the above. Various changes that those skilled in the art can understand within the scope of the invention can be made to the configuration and details of the invention in the present application.

This application claims priority based on Japanese Patent Application No. 2011-215094 filed on Sep. 29, 2011 and the entire disclosure thereof is incorporated herein.

REFERENCE SIGNS LIST

1 Radio parameter control apparatus
2 Radio base station
3 Radio cell
4 UE
5 Communication line
10 UE measurement information acquisition unit
11 Resource-allocated communication information acquisition unit
12 Radio quality prediction unit
13 Resource-allocated number-of-communications prediction unit
14 Communication quality prediction unit
15 Radio parameter decision unit
16 Radio cell quality information acquisition unit
17 Quality deterioration detection unit

The invention claimed is:

1. A radio parameter control apparatus comprising:
a radio quality prediction unit that predicts radio quality of a radio terminal due to change of a radio parameter of a radio cell, wherein the radio quality prediction unit predicts the radio quality of the radio terminal due to the change of the radio parameter using measurement results of the radio quality reported from the radio terminal before the change of the radio parameter is carried out;
a resource-allocated number-of-communications prediction unit that predicts the number of communications considered as allocation targets of radio resources in a radio cell due to the change of the radio parameter;
a communication quality prediction unit that predicts communication quality due to the change of the radio parameter based on a prediction result of the radio quality and a prediction result of the number of communications; and
a radio parameter decision unit that decides a radio parameter by which improvement of communication quality is predicted based on the predicted communication quality.

2. The radio parameter control apparatus according to claim 1, wherein the communication quality prediction unit carries out prediction of the communication quality using at least one of the measurement results of the radio quality.

3. The radio parameter control apparatus according to claim 1, wherein the communication quality prediction unit predicts that a radio cell to which a radio terminal connects is changed by the change of the radio parameter.

4. The radio parameter control apparatus according to claim 1, wherein the number of communications considered as the allocation targets of the radio resources is the number of radio terminals considered as allocation targets of radio resources.

5. The radio parameter control apparatus according to claim 1, wherein the number of communications considered as the allocation targets of the radio resources is the number of bearers considered as allocation targets of radio resources.

6. The radio parameter control apparatus according to claim 1, wherein the resource-allocated number-of-communications prediction unit predicts the number of communications considered as the allocation targets of the radio resources based on the number of communications in a previously set timing.

7. The radio parameter control apparatus according to claim 6, wherein the resource-allocated number-of-communications prediction unit averages the number of communications in a plurality of the previously set timings collected for a predetermined period, and predicts the number of communications considered as the allocation targets of the radio resources based on the averaged number of communications.

8. The radio parameter control apparatus according to claim 7, wherein a period when there does not exist any communications considered as the allocation targets of the radio resources is excluded from targets of average processing in the number of communications in the previously set timings being averaged.

9. The radio parameter control apparatus according to claim 1, wherein the radio parameter is a transmission power.

10. The radio parameter control apparatus according to claim 1, wherein the communication quality is a throughput.

11. The radio parameter control apparatus according to claim 10, wherein
the radio quality prediction unit predicts an SINR measured by the radio terminal due to the change of the radio parameter, and
the communication quality prediction unit predicts a throughput using the SINR, and a correspondence table of the SINR and the throughput or the SINR and Shannon's formula.

12. The radio parameter control apparatus according to claim 1, wherein the radio parameter decision unit selects a radio parameter by which at least either one of an average value of a plurality of the communication quality and a specific communication quality value extracted from a plurality of the communication quality is improved.

13. The radio parameter control apparatus according to claim 1, further comprising quality deterioration detection unit for detecting quality deterioration of a radio cell, wherein the radio parameter decision unit decides the radio parameter after detection of the quality deterioration.

14. The radio parameter control apparatus according to claim 13, wherein when the quality deterioration is detected after applying the decided radio parameter, the radio parameter decision unit resets the decided radio parameter to a radio parameter applied before, or applies another radio parameter by which improvement of communication quality is predicted.

15. The radio parameter control apparatus according to claim 1, wherein the radio parameters are decided regarding a plurality of radio cells, and a radio cell by which the predicted communication quality is improved is selected as a target radio cell for which a radio parameter is changed.

16. A radio base station comprising:
a radio quality prediction unit that predicts radio quality of a radio terminal due to change of a radio parameter of a radio cell, wherein the radio quality prediction unit predicts the radio quality of the radio terminal due to the change of the radio parameter using measurement results of the radio quality reported from the radio terminal before the change of the radio parameter is carried out;
a resource-allocated number-of-communications prediction unit that predicts the number of communications considered as allocation targets of radio resources in a radio cell due to the change of the radio parameter;
a communication quality prediction unit that predicts communication quality due to the change of the radio parameter based on a prediction result of the radio quality and a prediction result of the number of communications; and
a radio parameter decision unit that decides a radio parameter by which improvement of communication quality is predicted based on the predicted communication quality.

17. The radio base station according to claim 16, wherein the communication quality prediction unit carries out prediction of the communication quality using at least one of the measurement results of the radio quality.

18. The radio base station according to claim 16, wherein the communication quality prediction unit predicts that a radio cell to which a radio terminal connects is changed by the change of the radio parameter.

19. The radio base station according to claim 16, wherein the number of communications considered as the allocation targets of the radio resources is the number of radio terminals considered as allocation targets of radio resources.

20. The radio base station according to claim 16, wherein the number of communications considered as the allocation targets of the radio resources is the number of bearers considered as allocation targets of radio resources.

21. The radio base station according to claim 16, wherein the resource-allocated number-of-communications prediction unit predicts the number of communications considered as the allocation targets of the radio resources based on the number of communications in a previously set timing.

22. The radio base station according to claim 21, wherein the resource-allocated number-of-communications prediction unit averages the number of communications in a plurality of the previously set timings collected for a predetermined period, and predicts the number of communications considered as the allocation targets of the radio resources based on the averaged number of communications.

23. The radio base station according to claim 22, wherein a period when there does not exist any communications considered as the allocation targets of the radio resources is excluded from targets of average processing in the number of communications in the previously set timings being averaged.

24. The radio base station according to claim 16, wherein the radio parameter is a transmission power.

25. The radio base station according to claim 16, wherein the communication quality is a throughput.

26. The radio base station according to claim 25, wherein the radio quality prediction unit predicts an SINR measured by the radio terminal due to the change of the radio parameter, and
the communication quality prediction unit predicts a throughput using the SINR, and a correspondence table of the SINR and the throughput or the SINR and Shannon's formula.

27. The radio base station according to claim 16, wherein the radio parameter decision unit selects a radio parameter by which at least either one of an average value of a plurality of the communication quality and a specific communication quality value extracted from a plurality of the communication quality is improved.

28. The radio base station according to claim 16, further comprising quality deterioration detection unit for detecting quality deterioration of a radio cell, wherein the radio parameter decision unit decides the radio parameter after detection of the quality deterioration.

29. The radio base station according to claim 28, wherein when the quality deterioration is detected after applying the decided radio parameter, the radio parameter decision unit resets the decided radio parameter to a radio parameter applied before, or applies another radio parameter by which improvement of communication quality is predicted.

30. The radio base station according to claim 16, wherein the radio parameters are decided regarding a plurality of radio cells, and a radio cell by which the predicted communication quality is improved is selected as a target radio cell for which a radio parameter is changed.

31. A radio parameter control method, wherein
predicting radio quality of a radio terminal due to change of a radio parameter of a radio cell wherein the radio quality of the radio terminal due to the change of the radio parameter is predicted using measurement results of the radio quality reported from the radio terminal before the change of the radio parameter is carried out,
predicting the number of communications considered as allocation targets of radio resources in a radio cell due to the change of the radio parameter,
predicting communication quality due to the change of the radio parameter based on a prediction result of the radio quality and a prediction result of the number of communications, and
deciding a radio parameter by which improvement of communication quality is predicted based on the predicted communication quality.

32. The radio parameter control method according to claim 31, wherein the prediction of the communication quality is carried out using at least one of the measurement results of the radio quality.

33. The radio parameter control method according to claim 31, wherein in the prediction of the communication quality, it is predicted that a radio cell to which a radio terminal connects is changed by the change of the radio parameter.

34. The radio parameter control method according to claim 31, wherein the number of communications considered as the allocation targets of the radio resources is the number of radio terminals considered as the allocation targets of radio resources.

35. The radio parameter control method according to claim 31, wherein the number of communications considered as the allocation targets of the radio resources is the number of bearers considered as allocation targets of radio resources.

36. The radio parameter control method according to claim 31, wherein in the prediction of the number of communications, the number of communications considered as the allocation targets of the radio resources is predicted based on the number of communications in a previously set timing.

37. The radio parameter control method according to claim 36, wherein in the prediction of the number of communications, the number of communications in a plurality of the previously set timings collected for a predetermined period is averaged, and the number of communications considered as the allocation targets of the radio resources is predicted based on the averaged number of communications.

38. The radio parameter control method according to claim 37, wherein a period when there do not exist any communications considered as the allocation targets of the radio resources is excluded from targets of average processing in the number of communications in the previously set timings being averaged.

39. The radio parameter control method according to claim 31, wherein the radio parameter is a transmission power.

40. The radio parameter control method according to claim 31, wherein the communication quality is a throughput.

41. The radio parameter control method according to claim 40, wherein
in the prediction of the radio quality, predicting an SINR measured by the radio terminal due to the change of the radio parameter, and
in the prediction of the communication quality, predicting a throughput using the SINR, and a correspondence table of the SINR and the throughput or the SINR and Shannon's formula.

42. The radio parameter control method according to claim 31, wherein in the decision of the radio parameter, selecting a radio parameter by which at least either one of an average value of a plurality of the communication quality and a specific communication quality value extracted from a plurality of the communication quality is improved.

43. The radio parameter control method according to claim 31, wherein before the radio quality is predicted, quality deterioration of a radio cell is detected, and the radio parameter is decided in after the detection of the quality deterioration.

44. The radio parameter control method according to claim 31, wherein when quality deterioration of a radio cell is detected after the decided radio parameter is applied and the quality deterioration is detected, the decided radio parameter is reseted to a radio parameter applied before, or another radio parameter is applied by which improvement of communication quality is predicted.

45. The radio parameter control method according to claim 31, wherein the radio parameters are decided regarding a plurality of radio cells, and a radio cell by which the predicted communication quality is improved is selected as a target radio cell for which a radio parameter is changed.

46. A non-transitory computer readable medium having stored therein a program that makes a computer execute the steps of:
predicting radio quality of a radio terminal due to change of a radio parameter of a radio cell, wherein the radio quality of the radio terminal due to the change of the radio parameter is predicted using measurement results of the radio quality reported from the radio terminal before the change of the radio parameter is carried out;
predicting the number of communications considered as allocation targets of radio resources in a radio cell due to the change of the radio parameter;
predicting communication quality due to the change of the radio parameter based on a prediction result of the radio quality and a prediction result of the number of communications; and
deciding a radio parameter by which improvement of communication quality is predicted is decided based on the predicted communication quality.

\* \* \* \* \*